(12) United States Patent
Bastide et al.

(10) Patent No.: US 8,495,496 B2
(45) Date of Patent: Jul. 23, 2013

(54) COMPUTER METHOD AND SYSTEM AUTOMATICALLY PROVIDING CONTEXT TO A PARTICIPANT'S QUESTION IN A WEB CONFERENCE

(75) Inventors: Paul R. Bastide, Boxford, MA (US); John A. Jacobson, Medford, MA (US); Scott J. Martin, Bow, NH (US)

(73) Assignee: International Business Machines Corporation, Armonk, NY (US)

( * ) Notice: Subject to any disclaimer, the term of this patent is extended or adjusted under 35 U.S.C. 154(b) by 219 days.

(21) Appl. No.: 13/038,658

(22) Filed: Mar. 2, 2011

(65) Prior Publication Data

US 2012/0226984 A1   Sep. 6, 2012

(51) Int. Cl.
*G06F 3/00* (2006.01)
(52) U.S. Cl.
USPC ............ 715/730; 715/732; 715/733; 715/741
(58) Field of Classification Search
USPC .................................. 715/730, 732, 733, 741
See application file for complete search history.

(56) References Cited

U.S. PATENT DOCUMENTS

| 6,532,218 | B1 | 3/2003 | Shaffer et al. | |
|---|---|---|---|---|
| 6,976,231 | B1* | 12/2005 | Funahashi | 715/853 |
| 7,733,366 | B2 | 6/2010 | Beavers et al. | |
| 2004/0153504 | A1 | 8/2004 | Hutchinson | |
| 2007/0282948 | A1 | 12/2007 | Praino et al. | |
| 2007/0298404 | A1 | 12/2007 | Amell et al. | |
| 2010/0218099 | A1 | 8/2010 | van Melle et al. | |
| 2010/0257449 | A1* | 10/2010 | Lieb et al. | 715/730 |
| 2010/0257456 | A1* | 10/2010 | Lieb et al. | 715/741 |
| 2010/0332959 | A1 | 12/2010 | Mitchell | |

* cited by examiner

*Primary Examiner* — David Phantana Angkool
(74) *Attorney, Agent, or Firm* — Hamilton, Brook, Smith & Reynolds, P.C.

(57) ABSTRACT

Computer method and system provides context in an online meeting, a web conference or other shared slides application. A person (attendee or participant) asking a question does so in the specific section (slide) of the shared application. Screen images of these specific slides are captured and coupled to respective questions. The questions are queued for the presenter. Captured screen images provide context for the questions. Each question selected from the queue by the presenter automatically provides context without interrupting flow of the presentation and online meeting.

14 Claims, 3 Drawing Sheets

COMPUTER METHOD AND SYSTEM AUTOMATICALLY PROVIDING CONTEXT TO A PARTICIPANT'S QUESTION IN A WEB CONFERENCE

BACKGROUND

The present invention relates to Web conferences (generally online meetings or shared applications) and identifying references, and more specifically, to automatically providing context to a Web conference participant's question.

Often during a Web conference, a participant will have a question on one of a plurality of shared slides being presented by a presenter. It is difficult for the presenter to later switch back to the context of the question. But it is also disruptive to the flow of the presentation to stop the presenter for each question by a participant at the time that the slide of interest is displayed.

In example systems, in progress of a presentation, a participant has a question on a shared slide. The participant writes down the question for the "Question and Answer" (Q&A) session while the presenter continues with the presentation. During the Q&A session, the participant asks the question in reference to information on a slide (previously presented). The presenter cycles back through the presentation's set of slides to the particular slide, to establish context. The presenter then answers the question.

This is a cumbersome and time-consuming process. There is also an element of awkwardness where the presenter is trying to cycle back through the slides, under short recollection of the participant, while the participant tries to identify and hopefully accurately recall the subject slide in the presence of the Web conference, online meeting or shared application audience.

BRIEF SUMMARY

Accordingly, improvements in Q&A sessions of a Web conference, online meeting or shared application are needed.

At the core of the present invention are systems and methods to automatically provide a presenter with context to a participant's question in a Web conference, online meeting or other shared slide application.

The advantages brought about by the present invention include:

better user experience with web conferencing (online meeting), and
increased efficiency for Q&A sessions.

Embodiments leverage existing art on capturing screen images and known screen capture programs.

According to one embodiment of the present invention, a computer method of conducting an online meeting comprises:

through a computer network, providing a shared slide application in which a set of slides of a presentation is shared remotely between a presenter and at least a first attendee during a subject online meeting;

receiving at least a first query from the first attendee during the presentation, including capturing a screen image during display of one of the slides in the set of slides, the one slide corresponding to the first query; and displaying concurrently the first query and the captured screen image to at least the presenter, said concurrent display automatically providing context to the first query without interrupting flow of the presenter and flow of the presentation.

In some embodiments, the step of receiving at least a first query includes: receiving different queries from multiple attendees of the subject online meeting and capturing screen images of respective slides corresponding to the different queries.

Embodiments may further comprise:

placing in a queue the different queries and respective captured screen images from the attendees, and for each queued query, providing the queued query together with the respective captured screen image to the presenter in a manner enabling the presenter to establish context of the query. Alternative embodiments may have one or more presenters working with the queue.

The computer method may further include collating the queries in the queue based on respective slides or slide number or scene number indications corresponding to the captured screen images. The method may collate the queries in the queue based on frequency of occurrence of the respective slides corresponding to the captured screen images. The query having the most frequently occurring corresponding slide (or slide number or scene number) is placed first in the queue.

In embodiments, the displaying is also to other attendees of the subject online meeting.

In embodiments, the shared slide application enables at least one of Web conferencing, online meeting, and slide/video sharing.

The invention computer method and system hold the set of slides (i.e., the slide presentation) in a cache and may further comprise:

in addition to capturing screen image of the one slide, obtaining images of any combination of proceeding and succeeding slides to the one slide in presentation order; and during display of the first query and captured screen image, displaying the obtained images of the proceeding and succeeding slides.

The step of obtaining images may include returning copies of slides by slide number from the cache.

In yet other embodiments, the concurrent display providing context to the first query is free of the first attendee annotating the one slide.

Other embodiments include a computer system, apparatus or program product performing the foregoing method or implementing equivalent method steps.

BRIEF DESCRIPTION OF THE SEVERAL VIEWS OF THE DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

DETAILED DESCRIPTION

Embodiments of the present invention automatically provide context (for both the audience and the presenter) to a participant initiated question in a Web conferencing, online meeting or other shared slide application. Embodiments allow the person (attendee or participant) asking the question to pose the question during the specific section of the slide share/application share. In turn, embodiments couple, associate or otherwise correspond the question with an image (screen) capture of the subject shared application. This may include adding slide number to the question instead of or with the captured image from the shared application where the subject set of slides is cached on a server. As a result, context is automatically provided with every participant generated question without interrupting the flow of the presenter and without requiring the participants to annotate the slides with comments or notes (as made clear below).

The combined question and image capture (and/or slide number or scene number) are stored in a queue for the presenter (for example, to subsequently use during a question and answer session). When the presenter looks at the queue at an appropriate juncture of the presentation, he obtains the question and the context that the question is associated with. Embodiments then display the question and the corresponding image for the presenter (and optionally, the audience in due course). As a result, context is automatically provided with every participant initiated and generated question without interrupting the flow of the presentation or the presenter.

Figure 1:
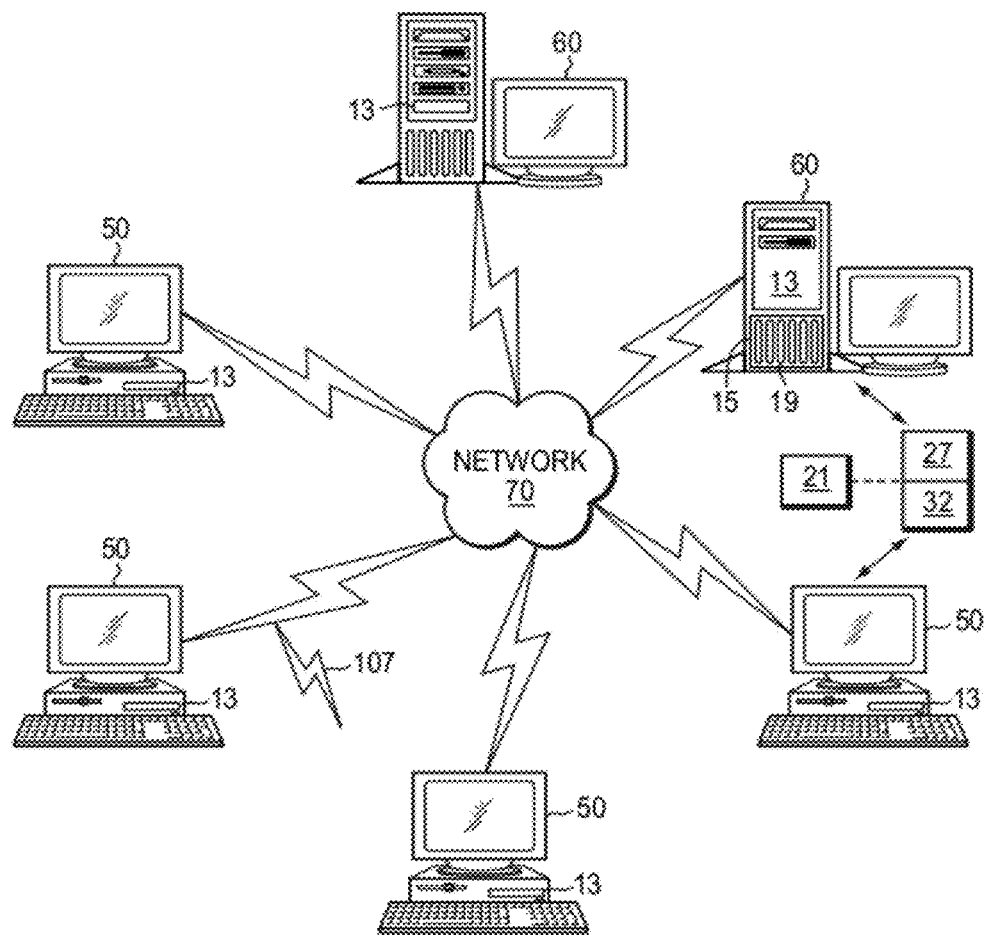
FIG. 1 is a schematic view of a computer network displaying an online meeting system embodying the present invention.
Figure 2:
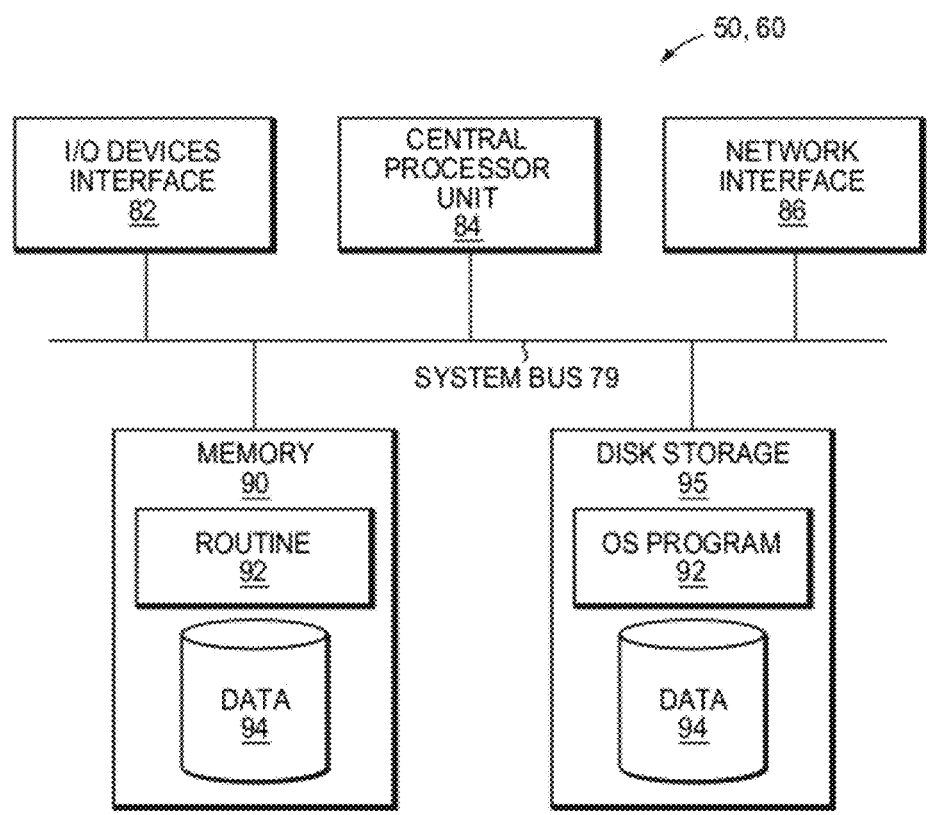
FIG. 2 is a computer node in the computer network of FIG. 1.

With reference now to FIGS. 1 and 2, FIG. 1 illustrates a computer network or similar digital processing environment in which online meeting systems 100 embodying the present invention may be implemented.

Client computer(s)/devices 50 and server computer(s) 60 provide processing, storage, and input/output devices executing application programs and the like. Client computer(s)/devices 50 can also be linked through communications network 70 to other computing devices, including other client devices/processes 50 and server computer(s) 60. Communications network 70 can be part of a remote access network, a global network (e.g., the Internet), a worldwide collection of computers, Local area or Wide area networks, and gateways that currently use respective protocols (TCP/IP, Bluetooth, etc.) to communicate with one another. Other electronic device/computer network architectures are suitable.

Server computer 60 supports or hosts an online session of a shared slide application 13, such as an online meeting or web conference. The shared slide application 13 provides an electronic slide presentation/show or a video show or other audio and visual effects for the online session. Common or known communications technology and network technology/techniques are utilized. Each slide 19 has a respective slide number (akin to a series order number) in the slide presentation. Like scenes may also be given a number identifier to facilitate collation of queries (explained further below). In one embodiment, a cache 15 of server 60 holds or otherwise stores the set of slides 19 forming the subject slide presentation of a presenter. Familiar caching techniques are employed.

The presenter and participants (attendees) log onto the online session through respective client computers or client devices 50. Server computer 60 executes server-side operations of shared slide application 13, and client computer/devices 50 execute client-side operations of shared slide application 13 in response to user (i.e. each of the presenter and participants/attendees) commands. In particular, server computer 60 accessing cache 15 provides display of subject presentation slides 19 through client computers/devices 50 according to presenter operation of shared slide application 13. Throughout the slide presentation, during display of each slide 19, invention system 100 (via a question generator 27) enables each participant to initiate a question (by keyboard or other input, for example). In response to a participant generating a question during a display of a given slide 19, system 100 (through image capture subsystem 32) automatically captures an image of the current screen display of given slide 19 and thus captures context for the participant's question. Screen image capture techniques, screen capture programs or similar known technology is employed. The image capture may occur on the client 50 or server computer 60. Screen image capture on the client computer 50 has the benefit of providing the most accurate context.

System 100 couples together the captured context (screen image of given slide 19) and the participant generated question. This results in a respective participant-generated question/question context data pair for each participant generated question during the online session. Structure of the data pair may include links, pointers and/or other suitable data structures. In one embodiment, system 100 includes in the data pair an indication of slide number of the given slide 19 and/or scene number of the given slide 19.

In embodiments, server 60 holds the participant-generated question/question context data pairs in a queue 21. The data pairs may be collated in queue 21 based on respective slide image or slide number or scene number, or based on frequency of occurrence of slide, slide number or scene number, or the like. System 100 enables the presenter to access queue 21 to preview and/or use the participant generated questions during the online session. Upon presenter selection of a participant generated question (i.e. data pair) from the queue 21, system 100/server 60 shows from the selected data pair the corresponding screen image capture (of display of the slide 19 at which the participant initiated the question). This provides to the presenter context of the participant generated question. Alternatively, system 100/server 60 uses, from the selected data pair, the indicated slide number and retrieves an image or copy of that slide from cache 15. In one embodiment, server 60 retrieves images or copies of neighboring (e.g., proceeding and/or succeeding in presentation order) slides 19 as well. Server 60 then displays the retrieved slides 19 (images thereof) to the presenter and in this way automatically provides context for the corresponding participant generated question.

Upon presenter command, server 60 displays to all participants (attendees) the above retrieved screen image/slide image(s) and corresponding participant generated question (for example, in a question and answer segment). Accordingly, system 100 automatically provides slide specific context to each participant generated question in an online session without interrupting the presenter and without interrupting the flow of the slide presentation.

FIG. 2 is a diagram of the internal structure of a computer (e.g., client processor/device 50 or server computers 60) in the computer system of FIG. 1. Each computer 50, 60 contains system bus 79, where a bus is a set of hardware lines used for data transfer among the components of a computer or processing system. Bus 79 is essentially a shared conduit that connects different elements of a computer system (e.g., processor, disk storage, memory, input/output ports, network ports, etc.) that enables the transfer of information between the elements. Attached to system bus 79 is I/O device interface 82 for connecting various input and output devices (e.g., keyboard, mouse, displays, printers, speakers, etc.) to the computer 50, 60. Network interface 86 allows the computer to connect to various other devices attached to a network (e.g., network 70 of FIG. 1). Memory 90 provides volatile storage for computer software instructions 92 and data 94 used to implement an embodiment of the present invention (e.g., query generator 27, image capture subsystem/mechanism 32, participant generated question/question context data pair, query 21 and supporting code). Disk storage 95 provides non-volatile storage for computer software instructions 92 and data 94 used to implement an embodiment of the present invention. Central processor unit 84 is also attached to system bus 79 and provides for the execution of computer instructions.

In one embodiment, the processor routines 92 and data 94 are a computer program product (generally referenced 92), including a computer readable medium (e.g., a removable storage medium such as one or more DVD-ROM's, CD-ROM's, diskettes, tapes, etc.) that provides at least a portion of the software instructions for the invention system. Computer program product 92 can be installed by any suitable software installation procedure, as is well known in the art. In another embodiment, at least a portion of the software instructions may also be downloaded over a cable, communication and/or wireless connection.

In other embodiments, the invention programs are a computer program propagated signal product 107 embodied on a propagated signal on a propagation medium (e.g., a radio wave, an infrared wave, a laser wave, a sound wave, or an electrical wave propagated over a global network such as the Internet, or other network(s)). Such carrier medium or signals provide at least a portion of the software instructions for the present invention routines/program 92.

In alternate embodiments, the propagated signal is an analog carrier wave or digital signal carried on the propagated medium. For example, the propagated signal may be a digitized signal propagated over a global network (e.g., the Internet), a telecommunications network, or other network. In one embodiment, the propagated signal is a signal that is transmitted over the propagation medium over a period of time, such as the instructions for a software application sent in packets over a network over a period of milliseconds, seconds, minutes, or longer. In another embodiment, the computer readable medium of computer program product 92 is a propagation medium that the computer system 50 may receive and read, such as by receiving the propagation medium and identifying a propagated signal embodied in the propagation medium, as described above for computer program propagated signal product.

Generally speaking, the term "carrier medium" or transient carrier encompasses the foregoing transient signals, propagated signals, propagated medium, storage medium and the like.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 3:
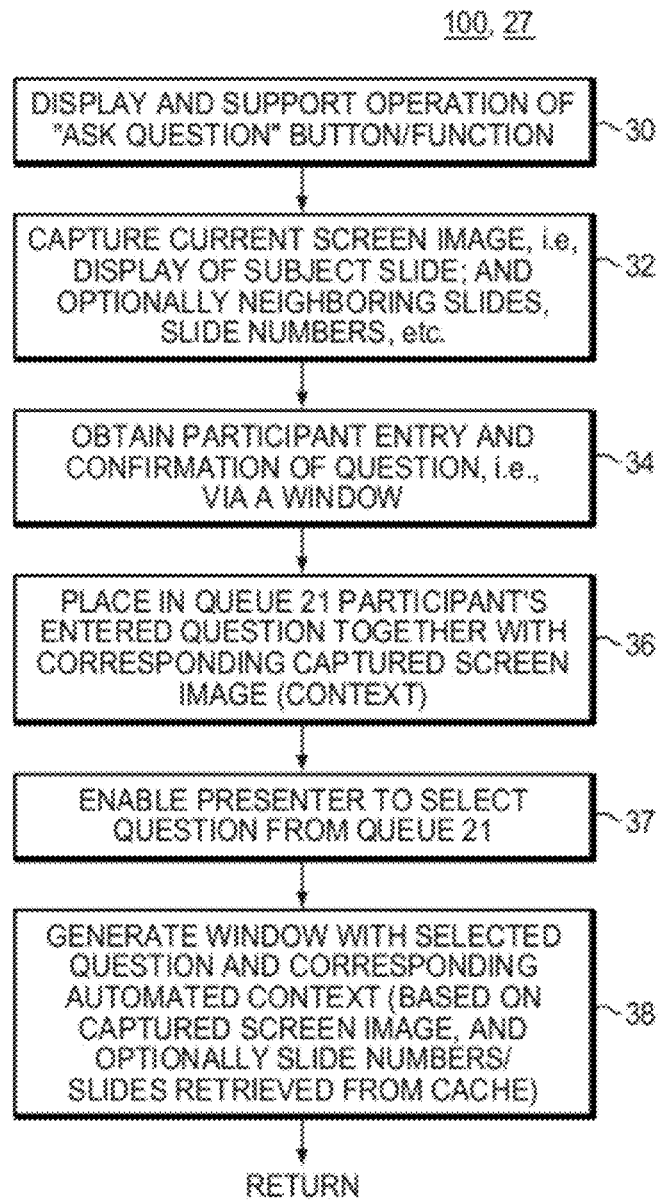
FIG. 3 is a flow diagram of one embodiment.

Referring now to FIG. 3, flow of data and control in one embodiment is illustrated. Online meeting system 100 implements shared slide application 13 and displays to participants slides 19 of a slide presentation by the presenter-user. Online meeting system 100 includes a query or question generator 27 as follows.

During display of a given slide 19, a participant has a question. In order to initiate the question, the participant operates (i.e., clicks) an "Ask Question" button or similar user command/menu option of query generator 27 (Step 30). In response, system 100 at step 32 captures the current screen image (which is display of given slide 19) and at Step 34 provides a pop up window prompting the participant to enter his question. Step 32 may be implemented by an image capture subsystem 32 (FIG. 1) that employs screen image capture technology or the like. Step 32 may include recording in queue 21 data the slide number indicative of given slide 19 and/or the scene number assigned to given slide 19.

After typing in his question, the participant confirms the question by clicking on an "OK" button or other similar operation. In response, Step 36 places the participant's question together with the corresponding screen image capture in Q&A Queue 21. In some embodiments, step 36 collates the question in the queue 21 based on respective slide or slide number or scene number of the corresponding screen image capture. For slide number or scene number used the most (highest frequency of occurrence in queue 21), step 36 in one embodiment places the corresponding question first in the queue 21. Other ordering or prioritizing schemas for questions in queue 21 are suitable.

When the Presenter finishes his slide presentation and begins a Q&A segment, the system 100 (step 37) enables the presenter to select the first question in queue 21. Responsive to presenter selection, step 38 generates a pop up window with the question and the corresponding screen capture. As a result, system 100 enables the presenter to quickly establish context of the question and in turn the presenter answers the displayed participant generated question. In other embodiments, step 38 further utilizes slide numbers recorded in the data stored in queue 21 to retrieve and display from cache 15 corresponding slide(s) for the selected question. Step 38 generates these displays at least for the presenter, but may be for both the presenter and attendees/participants.

Additional Considerations

In some embodiments, the system (step 32) can present for selection by a participant previous or neighboring slides during the ask question dialog and then in step 38 present images/copies of these additional slides (e.g., the current displayed slide is slide number six, the system shows slide number four and slide number five as an option).

The system (steps 30 and 36) can further leverage audio prompts to capture the participant's question, to capture current screen images, and to confirm entry of the question into Q&A queue 21.

It is noted that none of the steps and no part of system 100 requires the participant to annotate or otherwise manually mark the slide 19 of interest in order to ask his question. The system 100 automatically creates the association or correspondence between the slide 19 (image capture thereof) and the participant question.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

While this invention has been particularly shown and described with references to example embodiments thereof, it will be understood by those skilled in the art that various changes in form and details may be made therein without departing from the scope of the invention encompassed by the appended claims.

What is claimed is:

1. A computer method of conducting an online meeting comprising:

through a computer network, providing a shared slide application in which a set of slides of a presentation is shared remotely between a presenter and at least a first attendee during a subject online meeting;

receiving at least a first query from the first attendee during the presentation, including capturing a screen image during display of one of the slides in the set of slides, the one slide corresponding to the first query, wherein said receiving includes receiving different queries from multiple attendees of the subject online meeting and capturing screen images of respective slides corresponding to the different queries;

placing in a queue the different queries and respective captured screen images from attendees;

for each queued query, providing the queued query together with the respective captured screen image to the presenter in a manner enabling the presenter to establish context of the query;

collating the queries in the queue based on frequency of occurrence of respective slides corresponding to the captured screen images, the query having the most frequently occurring corresponding slide being placed first in the queue; and displaying concurrently the first query and the captured screen image to at least the presenter, said concurrent display automatically providing context to the first query without interrupting flow of the presenter and flow of the presentation.

2. A computer method as claimed in claim 1, further including collating the queries in the queue based on respective slides corresponding to the captured screen images.

3. A computer method as claimed in claim 1, wherein said displaying is also to other attendees of the subject online meeting.

4. A computer method as claimed in claim 1, wherein the shared slide application enables at least one of web conferencing, online meeting, and slide sharing.

5. A computer method as claimed in claim 1 further comprising:

in addition to capturing screen image of the one slide, obtaining images of any combination of proceeding and succeeding slides to the one slide in presentation order; and during display of the first query and captured screen image, displaying the obtained images of the proceeding and succeeding slides.

6. A computer method as claimed in claim 5 wherein the set of slides is held in a cache; and wherein the step of obtaining images includes returning copies of slides by slide number from the cache.

7. A computer method as claimed in claim 1 wherein the concurrent display providing context to the first query is free of the first attendee annotating the one slide.

8. A computer apparatus conducting an on-line meeting, comprising:

given in a computer network, a shared slide application having a set of slides of a presentation being shared remotely between a presenter and at least a first attendee in a subject online meeting, a query generator executable by a computer in the network and configured to receive at least a first query from the first attendee during display of one of the slides during the presentation;

an image capture subsystem coupled to the query generator and responsive to the received at least first query, the image capture subsystem capturing a screen image of the one slide during the display of the one slide in the presentation, the one slide corresponding to the first query, wherein the query generator further receives different queries from multiple attendees of the subject online meeting;

the image capture subsystem captures screen images of respective slides corresponding to the different queries;

a queue, the query generator placing in the queue the different queries from the attendees and respective captured screen images, and for each queued query, the queue providing to the presenter the queued query together with the respective captured screen image in a manner enabling the presenter to establish context of the query;

wherein the queries in the queue are collated based on frequency of occurrence of respective slides corresponding to the captured screen images, the query having the most frequently occurring corresponding slide being placed in the queue; and a display monitor coupled for communication with the query generator and image capture subsystem, the display monitor displaying concurrently the first query and the captured screen image to at least the presenter, said concurrent display automatically providing context to the first query without interrupting flow of the presenter and flow of the presentation.

9. A computer apparatus as claimed in claim 8 wherein the queries in the queue are collated based on respective slides corresponding to the captured screen images.

10. A computer apparatus as claimed in claim 8 wherein the shared slide application enables at least one of web conferencing, online meeting, and slide sharing.

11. A computer apparatus as claimed in claim 8 wherein the image capture subsystem further obtains images of any combination of proceeding and succeeding slides to the one slide in presentation order, and the display monitor displays the obtained images of the proceeding and succeeding slides.

12. A computer apparatus as claimed in claim 11 wherein the image capture subsystem obtains the images by returning copies of the slides by slide number from a cache.

13. A computer apparatus as claimed in 8 wherein the concurrent display providing context to the first query is free of the first attendee annotating the one slide.

14. A computer program product comprising:

a non-transitory computer readable storage medium having computer readable program code embodied therewith which when executed by a computer processor causes:

through a computer network, providing a shared slide application in which a set of slides of a presentation is shared remotely between a presenter and at least a first attendee during a subject online meeting;

receiving at least a first query from the first attendee during the presentation, including capturing a screen image during display of one of the slides in the set of slides, the one slide corresponding to the first query;

wherein receiving at least a first query includes receiving different queries from multiple attendees of the subject online meeting and capturing screen images of respective slides corresponding to the different queries;

placing in a queue the different queries and respective captured screen images from the attendees, and for each queued query, providing the queued query together with the respective captured screen image to the presenter in a manner enabling the presenter to establish context of the query;

collating the queries in the queue based on frequency of occurrence of respective slides corresponding to the captured screen images, the query having the most frequently occurring corresponding slide being placed first in the queue; and displaying concurrently the first query and the captured screen image to at least the presenter, said concurrent display automatically providing context to the first query without interrupting flow of the presenter and flow of the presentation.

* * * * *